United States Patent
Benz et al.

(10) Patent No.: US 6,554,303 B2
(45) Date of Patent: Apr. 29, 2003

(54) DEVICE FOR MEASURING A STEERING ANGLE AND FOR TRANSFERRING SIGNALS BETWEEN A STEERING COLUMN AND A STEERING ROD OF A MOTOR VEHICLE

(75) Inventors: Jürgen Benz, Besigheim (DE); Christian Höhler, Tamm (DE); Michael Schlegel, Oberstenfeld (DE); Jürgen Nies, Pforzheim (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 09/930,983

(22) Filed: Aug. 17, 2001

(65) Prior Publication Data

US 2002/0041074 A1 Apr. 11, 2002

Related U.S. Application Data

(63) Continuation-in-part of application No. 09/331,566, filed as application No. PCT/EP97/05654 on Oct. 14, 1997, now abandoned.

(30) Foreign Application Priority Data

Dec. 19, 1996 (DE) .......................... 196 52 935

(51) Int. Cl.$^7$ .......................... B60R 16/02; B60R 21/01; G01B 7/30

(52) U.S. Cl. ............... 280/93.5; 180/446; 324/207.17; 324/207.25; 307/10.1

(58) Field of Search ................. 280/93.5; 180/446, 180/422; 324/207.17, 207.18, 207.25; 307/10.1

(56) References Cited

U.S. PATENT DOCUMENTS

| 4,829,247 A | * | 5/1989 | Wallrafen | 324/207.17 |
| 5,636,863 A | * | 6/1997 | Reid et al. | 280/735 |
| 5,856,710 A | * | 1/1999 | Baughman et al. | 307/10.1 |
| 6,147,416 A | * | 11/2000 | Mitsuzuka | 307/10.1 |

FOREIGN PATENT DOCUMENTS

| DE | 44 04 816 | * | 8/1995 |
| EP | 0 520 535 | * | 12/1992 |

* cited by examiner

Primary Examiner—Peter C. English
(74) Attorney, Agent, or Firm—Paul Vincent

(57) ABSTRACT

The invention concerns an arrangement for carrying out steering angle or steering wheel angle measurements ($\alpha$) in motor vehicles. The arrangement uses a resolver for transmission purposes. Advantageous developments concern the use of the resolver for the additional transmission of switching information in both directions and for transmission of energy using frequency-separated or time-multiplexed transmission channels.

11 Claims, 4 Drawing Sheets

DEVICE FOR MEASURING A STEERING ANGLE AND FOR TRANSFERRING SIGNALS BETWEEN A STEERING COLUMN AND A STEERING ROD OF A MOTOR VEHICLE

This application is a continuation in part of application Ser. No. 09/331,566 filed Jun. 18, 1999, now abandoned, which was the National Stage of PCT/EP 97/05654 filed Oct. 14, 1997. The disclosure of application Ser. No. 09/331, 566 is hereby incorporated by reference.

BACKGROUND OF THE INVENTION

The measurement of the steering angle and a respective change in the vehicle steering angle is of great importance for the dynamic regulation of vehicles. Various measuring principles can be used for the determination of the steering wheel angle, corresponding to the steering angle. Digital optical processes include discrete transmitting and receiving modules as well as charge-coupled device modules. Magnetically sensitive components include Hall elements. In Zeitschrift Antriebstecnik, Vol. 33 (1994) Issue No. 7, pp. 28–29, a resolver has been described as an additional sensor for the angle of rotation which can be used for the mechanical design of tools, robots, printing presses, packaging machines, etc.

Resolvers consist, in principle, of a rotor and a stator. A sinusoidal magnetic field is generated at the rotor which rotates along therewith. This field induces voltages in two phase windings of the secondary stator winding which are a function of the rotational position of the rotor. In order to obtain sine and cosine signals, the two phase windings of the stator are offset by 90°. In the case of the conventional resolver, the transmission of electrical energy is accomplished with the aid of a coupling transformer. This consists of two concentric windings: a primary winding mounted in the stator housing and a secondary winding located on the rotor, with which it rotates. The secondary winding feeds the sine-generating winding via two conductors to the rotor. Novel developments without wiper contacts have been proposed. More exact information in this regard is given in the above cited article.

SUMMARY OF THE INVENTION

It is the object of the present invention to introduce a novel measuring device for the measurement of the vehicle steering angle which is able to specify the absolute angle of rotation and which is very robust with regard to design. A resolver of the type described above is therefore used in accordance with the invention for the measurement of the vehicle steering angle and the respective change in the vehicle steering angle. The resolver contains a stator with three windings. There is a field winding as a primary winding and two secondary windings mutually offset by 90°. The rotor may also be equipped with an auxiliary winding or with magnetic materials. By means of an evaluation circuit, which can be obtained as a single integrated circuit (IC) from Analog Devices, e.g., the absolute value of the angle of rotation is determined by input of a constant frequency signal, for example 10 kHz, and by evaluation of the voltage induced in the two 90° offset secondary windings.

The use of a resolver in the measuring device in accordance with the invention offers a number of advantages, wherein an identification of the absolute value of the angle between 0° and 360° is possible. The measured values can be specified precisely to 13 bits without difficulty, which corresponds to a resolution of 0.05°. Furthermore, the resolver is free of interference with respect to temperature, dirt, mechanical vibration and has good electromagnetic performance. Also, the physical dimensions of the resolver can be well adapted to the prevailing requirements of a vehicle.

As was already described in connection with other steering angle sensors, the steering angle sensor according to the invention can also be integrated into the steering column assembly switch. The rotor must be integrally coupled to the rotatable steering rod and the stator can be mounted to the steering column tube.

The measuring device according to the invention facilitates an additional central option of providing wireless signal transmission, in the most general sense, between devices in the vehicle mounted rigidly with respect to the chassis and devices rotatable with the steering wheel. For this purpose, special rotary connectors were previously used which transmitted the signals via helical springs or coiled flat-band cables (so-called coil springs) between the steering wheel and the devices fixed with respect to the chassis. A wiper contact was also used in connection with such signal transmission. The present invention now makes use of the fact that an inductive coupling is present between the rotor connected to the steering wheel and the stator. It is therefore possible to exchange signals between the rotor and the primary and/or the secondary winding of the stator using this inductive coupling. The signals can thus arrive at the steering wheel in order to trigger an actuator for an air bag, for example, and may also be conducted away from the steering wheel, in order, e.g., upon activation of a horn contact, to bring a control signal to the horn rigidly mounted with respect to the chassis. In this manner, either control signals or control information can be fed toward the steering wheel and into the stator winding or be transmitted in the opposite direction. The control signals are passed to a winding connected to the steering column and further processed in an electronic circuit for the control of devices located on the steering wheel and corresponding signals coming from the steering wheel are transmitted in order to be able to activate, from the steering wheel, devices rigidly mounted with respect to the chassis.

In addition to the transmission of information signals for driving individual devices, the invention is also suitable for supplying power to operate changeover switches connected to the steering wheel.

Since the individual signals must not interfere with one another or become superimposed, the invention proposes that these individual signals be transmitted sequentially in time via the resolver or that separate frequency channels be provided for the signals being transmitted. Thus, for example, a frequency of 10 kHz can be provided for the measurement of the angle of rotation itself, while a frequency band lying above this frequency can be used for the transmission of the other signals. In this manner, several time-multiplexed or frequency-separated channels are created in the resolver so that it can deal with the different objectives described above. A combination of these measures is also possible.

The devices connected to the steering wheel can include, for example, a triggering circuit for an air bag or a control circuit for activating electrical devices, wherein the electrical devices can be rigidly mounted in the vehicle with respect to the chassis, e.g. an auto horn, a radio, or vehicle lights. According to the above-described system, control signals generated at the steering wheel can be transferred for various devices without contact and in a reliable fashion via the resolver. In principle, not only can the individual signals be assigned to different frequency bands or transmitted in time-multiplexed fashion, but only a single information signal can also be used which is encoded to transmit different information. The information signals can thereby be transmitted or exchanged between the steering wheel and the devices in the vehicle, rigidly fixed with respect to the chassis. Various information present on the car information network (CAN) can therefore be transmitted, without contacts, to provide a CAN transmission and return path to the steering wheel.

An encoding can occur with the aid of a central electronic circuit that is arranged at the input or output of the stator windings or at the input or output of the rotor winding. In particular, information can, for example, be transmitted for ignition of the air bag ignition pellet when the sensors of the vehicle have determined a corresponding presence of danger.

The stator can comprise a primary winding and two auxiliary or secondary windings that are connected in the manner of a transformer. A rotor with a rotor coil is particularly important with respect to the resolver. The position of this winding influences the amplitude of the signals at the secondary windings such that, on the basis of these signals, the rotational position of the rotor can be deduced. The secondary windings are rotated through 90° with respect to one another so that the induced voltages correspond to the sine and cosine of the rotor angle. More precise details can be deduced from the 1994 prospectus of Admotec Präzision AG, Küssnacht/Switzerland, in which a rotor is described in detail.

The signal transmission between the rotor coil connected to the steering wheel and the stator windings can be time- or frequency-multiplexed. The auxiliary windings of the stator determine the angle of rotation $\alpha$ using a frequency of 10 kHz and via a low-pass filter. In addition thereto, various information coming from the steering wheel can also be supplied into the winding. This can occur at frequencies which lie sufficiently above or below the frequency for measurement of the angle of rotation. For example, the information from a sensor on the steering wheel or a switch setting can serve as steering wheel information which is converted into suitable frequency signals in the steering wheel circuit. These signals can then be detected by the windings of the stator using an appropriate filter, (e.g. a band-pass filter) as well as a first stator circuit and either supplied to the electronic CAN or used directly to trigger actuators (horn, blinkers, radio). In the opposite direction, sensor information or information from the CAN can be converted into frequencies appropriate to the filter, so that this information can be processed by a steering wheel circuit and evaluated for triggering suitable actuators (for example, the ignition pellet for the air bag).

A generator can supply the frequency to the primary winding which is necessary for activation of the resolver to measure the angle of rotation.

The power for the steering wheel circuit can also be supplied to the steering wheel without contacts via the windings of the resolver. The central circuit and parts of the resolver itself (stator) can be integrated into a steering column assembly switch. Via the central circuit, switch states of the steering column assembly switch can be transmitted via the CAN bus to the electrical devices rigidly disposed with respect to the chassis.

The information for angle identification (at a frequency of 10 kHz) and the remaining switch information can also be transmitted in time-multiplexed fashion.

When the information relating to the angle of rotation is processed at a frequency of 10 kHz, a band-pass filter operating in a higher range of frequencies can be used for secure transmission of the switch information.

An embodiment of the invention will now be described with reference to the drawing.

DESCRIPTION OF THE PREFERRED EMBODIMENT

Figure 1:
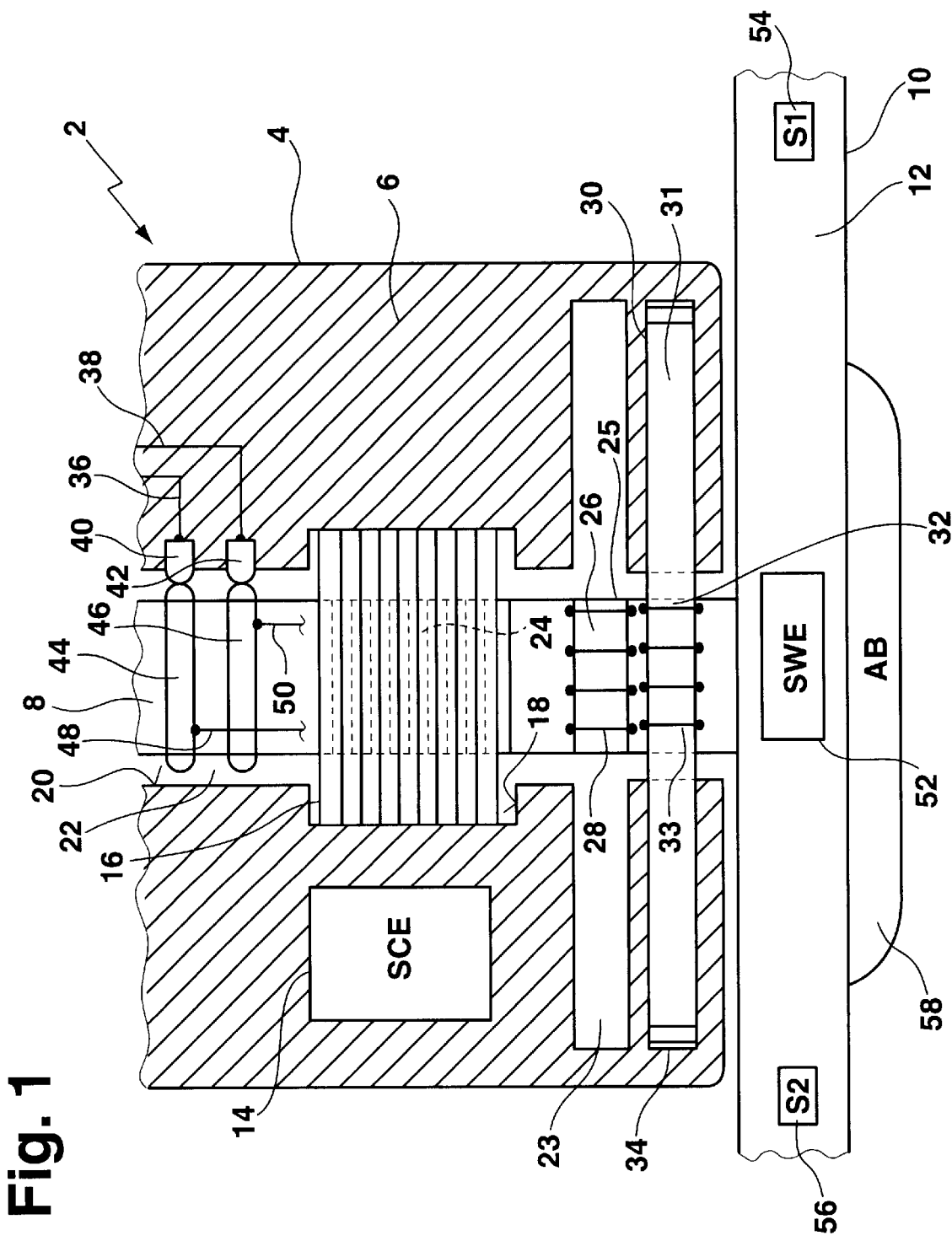
FIG. 1 shows a plan view of a steering column assembly in accordance with the invention.
Figure 3:
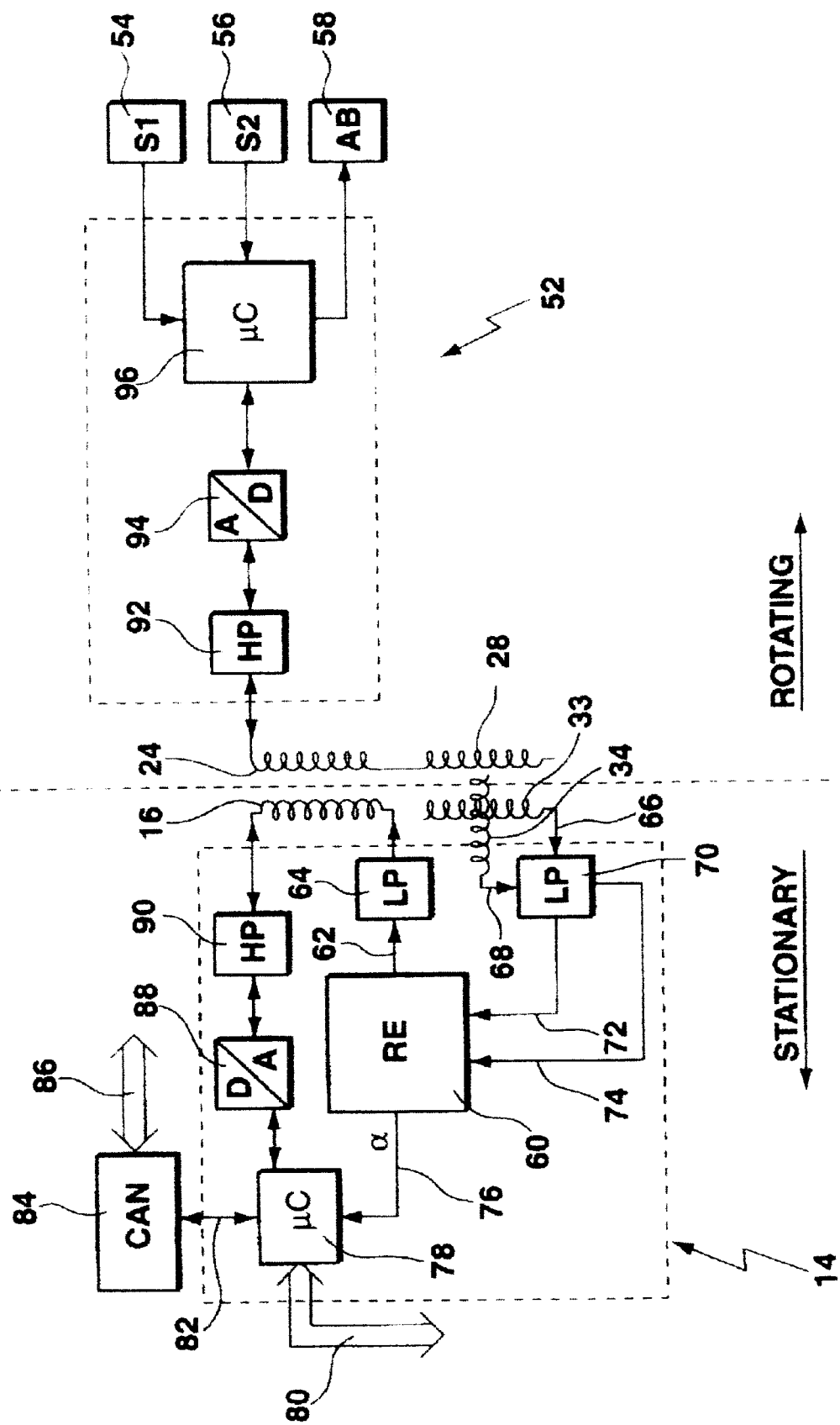
FIG. 3 shows a conceptional logic diagram for the circuit configuration of the steering column electronics and the steering wheel electronics in an embodiment of the invention involving frequency filtering and separation.
Figure 4:
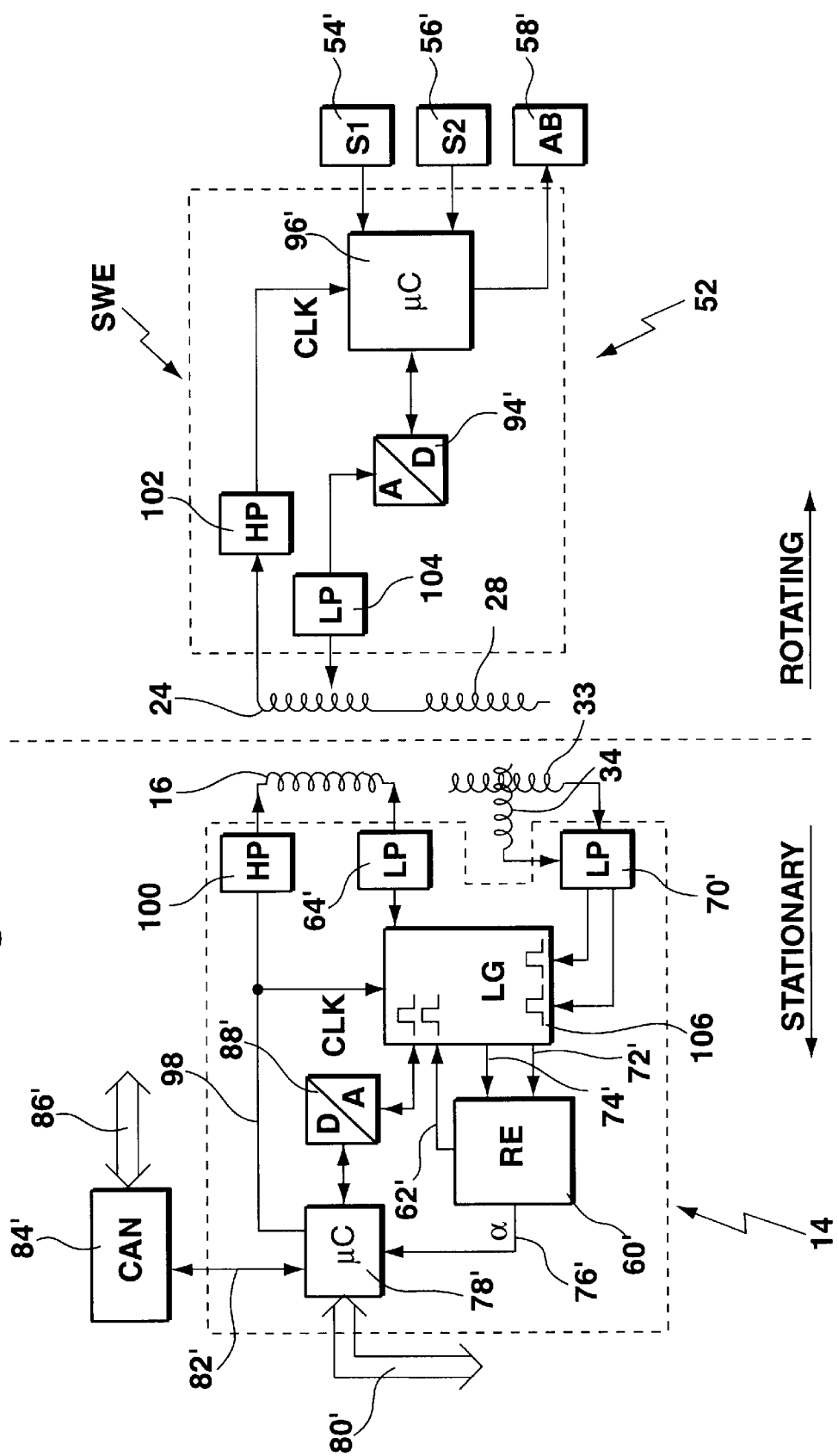
FIG. 4 shows a second embodiment for the steering column electronics and steering wheel electronics in accordance with the invention, involving a time multiplexing system.

FIG. 1 illustrates a steering column assembly 2 in plan view. The steering column assembly 2 comprises an outer member 4 having a steering column casing 6 which is cut open in the view of FIG. 1 to permit viewing of the inside components of the steering column assembly 2. A steering rod 8 is borne within the stationary outer member 4 of the steering column assembly 2 for rotation about a central axis thereof. The steering rod 8 communicates with a steering wheel 10 having a steering wheel casing 12 which is cut open in the view of FIG. 1 to permit observation of internal components thereof which are relevant to the invention. The operator of the motor vehicle can grasp the steering wheel 10 at outer portions thereof (shown truncated in the view of FIG. 1) to rotate the steering rod 8. The steering rod 8 is in mechanical communication with the steered wheels of the motor vehicle for steering thereof. The outer member 4 of the steering column assembly 2 houses a steering column electronics 14 which is described more closely with reference to FIGS. 3 and 4 below. For reasons of clarity, electrical connections between the steering column electronics 14 and the various electronic components in the steering column assembly have been omitted in FIG. 1 and are illustrated in FIGS. 3 and 4 only. The steering column electronics 14 is in electronic communication (see FIGS. 3 and 4 below) with a primary winding 16 of a resolver. The primary winding 16 is disposed within an annular inset 18 fashioned in an inner wall 20 of the outer member 4. The inner wall 20 defines an inner gap 22 with respect to an outer surface of the steering rod 8 to facilitate rotation of the steering rod 8 relative to the stationary outer member 4. The steering rod 8 supports a secondary winding 24 wound in an annular fashion about an outer surface of the steering rod 8. The primary winding 16 and the secondary winding 24 are coaxially disposed for good mutual inductive coupling. The secondary winding 24 is in electrical communication with a rotor winding 28 wound about a rotor body 26 of a rotor member 25. The rotor member 25 is mounted for secure mutual rotation along with the steering rod 8. The steering column casing 6 defines a rotor gap 23 to permit free rotation of the rotor member 25, A stator 30 is disposed directly adjacent to the rotor member 25 and is mounted to the fixed outer member 4. The stator 30 comprises a stator body 31 having a disk shape about which a y-winding 33 and a x-winding 34 are wound (see also FIG. 2). The stator body 31 has a central opening 32 through which the steering rod 8 passes. The geometrical orientation of the rotor winding 28 relative to the mutually perpendicular x-winding 34 and y-winding 33 produces an inductive coupling between the rotor winding 28 and each of the y-winding 33 and the x-winding 34 which depends on an angle of rotation of the steering rod 8. (Discussed in greater detail below in connection with FIGS. 2 and 3.) A first and second power line 36 and 38 are connected to a power source within the motor vehicle to transport power to the stationary outer member 4 and, via first and second contacts 40 and 42, to first and second contact rings 44 and 46, mounted for secure rotation with the steering rod 8. The power is further transported along first and second steering wheel power lines 48 and 50 (shown in a truncated fashion in FIG. 1 for reasons of clarity) which are in electrical communication with the steering wheel electronics 52 disposed in steering wheel 10.

The steering wheel electronics 52 is in electrical communication with a first switch 54 and a second switch 56 (see FIGS. 3 and 4). The associated leads have been omitted from FIG. 1 for reasons of clarity and are illustrated in FIGS. 3 and 4 only. The first switch 54 could, for example, be a cruise control and the second switch 56 could provide means for controlling a radio or other auxiliary device. The switches 54 and 56 are configured in the steering wheel 10 for activation by the driver of the motor vehicle during travel. The steering wheel electronics 52 is in communication with an airbag system 58 comprising an airbag and a control and ignition system therefor (see FIGS. 3 and 4).

Figure 2:
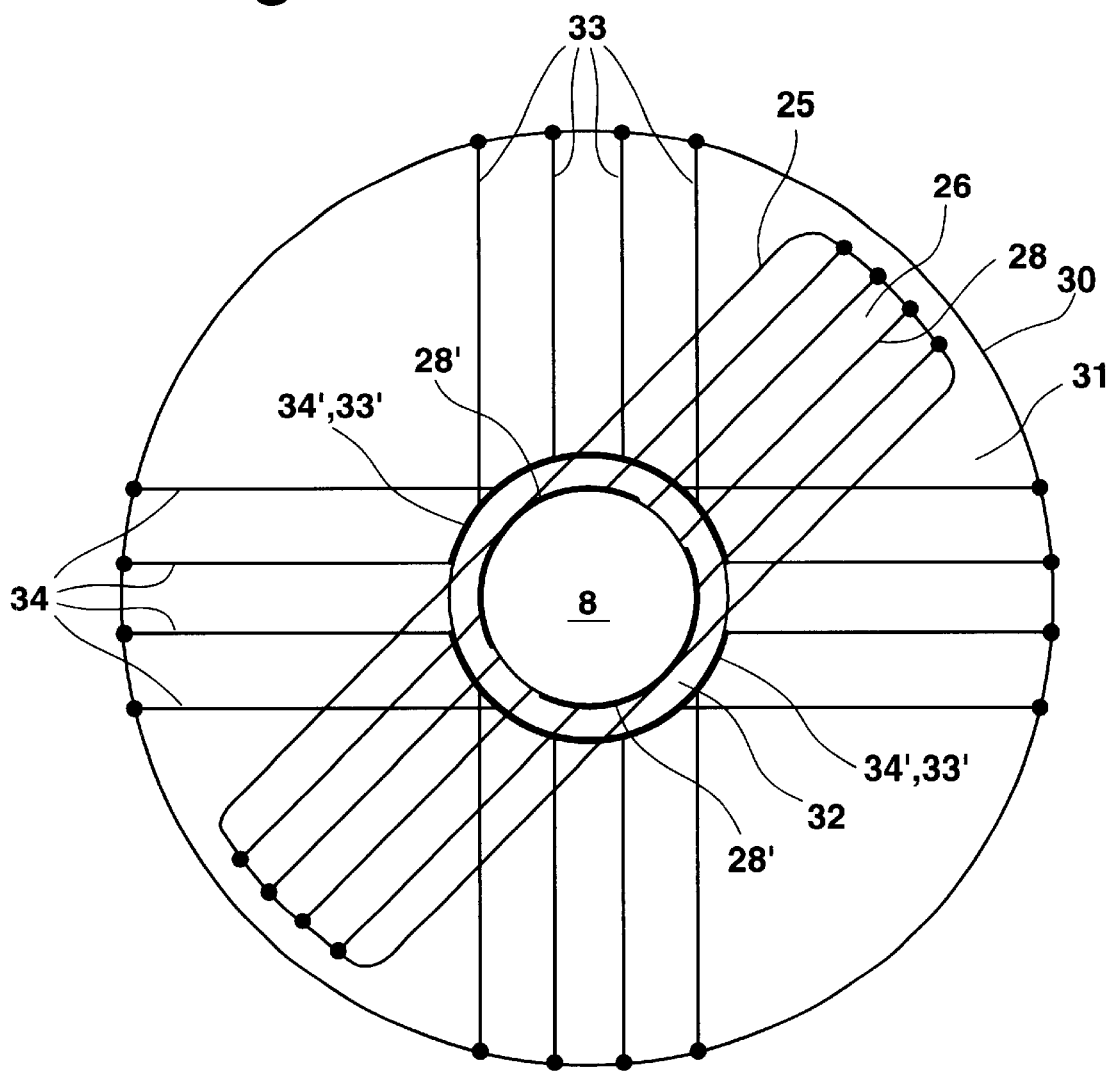
FIG. 2 shows a front view of the rotor stator geometry in the resolver incorporated in the steering column in accordance with the invention.

FIG. 2 provides a front view of the stator 30 and rotor member 25 in accordance with the invention. The rotor member 25 is shown rotated through 45 degrees with respect to the vertical orientation thereof given in FIG. 1, so that the rotor winding 28 as well as the x- and y-windings 34, 33 of the stator can be more clearly seen. The reference symbols 34' indicate portions of the cables of the x-winding 34 that extend around the stator opening 32. Reference symbol 33' correspondingly indicates portions of the cables of the y-winding 33 that extend around the stator opening 32 and reference symbol 28' indicates portions of the cables of the rotor winding 28 that extend around the steering rod 8. The amplitude of currents induced in the x- and y-windings of the stator are proportional to the flux of magnetic field lines generated by the rotor member 25, which in turn, depends on an angle α that the rotor member winding 28 assumes with respect to a vertical orientation thereof. In particular, the voltage induced in the x-winding ideally has a cos α dependence and that induced in the y-winding a sin α dependence. However, the non-linear passage of the x and y-windings 34, 33 about the stator opening 32 as well as the necessity for the rotor windings 28 to bypass about the stator 8 results in components of magnetic field induction which are not directly proportional to the angle α in the manner described above. Nevertheless, it is clear that maximum induced current is produced when the rotor winding 28 is parallel to the respective x-winding 34 and y-winding 33 and that the induced current in the x-winding 34 and the y-winding 33 is minimum when the rotor winding 28 is at right angles with respect thereto. Methods by which such non-linear corrections to the theoretical sine and cosine dependences can be made are described in detail in U.S. Pat. No. 4,829,247, the complete disclosure of which is hereby incorporated by reference. U.S. Pat. No. 4,829,247 also provides detailed circuit diagrams and electronics for use in determining the rotation angle α of the rotor member 25 which are suitable to use in accordance with the present invention.

FIG. 3 illustrates a first electronics scheme for use in a frequency multiplexing or divisional system in accordance with the invention. The portion to the right of the vertical dashed line represents the electronics mounted to the rotating components (the steering wheel 10 and steering rod 8). The components disposed to the left of the vertical dashed line indicate the stationary components of the electronics disposed in the outer member 4 or stationary portions of the steering column assembly 2. The primary winding 16 is indicated as is the secondary winding 24. The coupling between primary winding 16 and secondary winding 24 is inductive, wherein secondary winding 24 is in direct electrical contact with rotor winding 28. Therefore alternating currents in primary winding 16 will induce alternating currents in secondary winding 24 which are then directly passed to rotor winding 28. Rotor winding 28 is inductively coupled to x-winding 34 and y-winding 33 and induces currents therein which are approximately proportional to the cosine and sine of the angle α between the rotor winding 28 and a respective one of the x-winding 34 and y-winding 33.

The steering column electronics 14 (indicated in its totality by the dash-lines in the left portion of FIG. 3) comprises an analog resolver electronics 60. The resolver electronics 60 produces an excitation signal 62 which may have a frequency of 10 kHz. This signal 62 is passed to a first low pass filter 64 designed to pass the excitation signals 62 emitted by the resolver electronics 60. The first low pass filter 64 is connected to the primary winding 16, wherein the excitation signal 62 is inductively coupled to the secondary winding 24 and passed on to the rotor winding 28 which, In turn, is inductively coupled, with the above described sin α cosine α dependence, to the y-winding 33 and the x-winding 34 of the stator 30. The y-winding 33 output, is passed along a y-winding output lead 66 to an input of a second low pass filter 70. Similarly, the x-winding 34 output is passed along an x-winding output lead 68 to a second input of the second low pass filter 70. The second low pass filter 70 is structured similar to the first low pass filter 64 to pass the induced x-winding and y-winding signals. The second low pass filter 70 is connected, via an x-winding signal lead 72 as well as a y-winding signal lead 74, to an input of the resolver electronics 60. The resolver electronics 60 processes the x-winding signal as well as a y-winding signal into an angle information α which is output on lead 76 to a first microcontroller 78. The manner in which the resolver electronics 60 generates the excitation signal 62 and processes the x- and y-winding signals into an angle α is known to one of skill in the art (see U.S. Pat. No. 4,829,247).

The first micro-controller 78 has an output in communication with a steering column bus 80 which can connect to steering column switches such as blinker switches, light switches and the like. A second bi-directional output of the first micro-controller is carried by first micro-controller CAN lead 82 which is in electrical communication with a CAN transceiver 84. The CAN transceiver 84 communicates with a can bus 86 to send and receive signals from various components distributed about the motor vehicle. A second bi-directional connection of the first micro-controller 78 leads to a digital/analog converter 88 which, as indicated schematically in FIG. 3, takes digital output from the micro-controller and converts it into analog output for passage to a downstream high-pass filter 90. Digital information communicated by the micro-controller 78 via the digital to analog converter 88 is in a frequency range which is sufficiently higher than that exhibited by the excitation signal 62 such that the excitation signal 62 does not pass through the first high pass filter 90 and such that the digital signals emanating from the first micro-controller 78 do not pass through the first and second low pass filters 64 and 70. In this manner, the analog signals necessary for the angular measurement are segregated, via the first and second low pass filters 64 and 70, from higher frequency digital information emanating from micro-controller 78 and vice versa. Typical frequencies at which the micro-controller 78 can output digital information can be on the order of 1 MHz or more. The first high pass filter 90 is connected to the primary winding 16 of the resolver which inductively passes its output to the secondary winding 24. The secondary winding 24 is in communication with a second high pass filter 92 resident within the steering wheel electronics 52 (dashed-lined box to the right of FIG. 3). The second high pass filter 92 passes the signals originally emanating from the first micro-controller 78 while blocking excitation signals 62 necessary for the angular measurement in the resolver. The high frequency signals are passed to a second analog/digital converter 94 which, in turn, digitizes the signals into a pattern corresponding to their original configuration in the micro-controller 78 and communicates these digital signals to a downstream second micro-controller 96. The second micro-controller 96 is in electrical communication with the first switch 54 and the second switch 56 as well as with an airbag system 58.

In the event of a crash or accident during driving of the motor vehicle, an appropriate acceleration sensor or the like issues a signal to CAN bus 86 which is transferred via CAN transceiver 84 and first micro-controller CAN lead 82 to the micro-controller 78. The micro-controller 78 exports the crash signal to the first digital/analog converter 88 which, in turn, passes an analog crash signal through the first high pass filter 90 which is passed through the circuit as described above and is reconverted into its original digital format in second analog/digital converter 94. The second analog/digital converter 94 exports the digital crash signal to second micro-controller 96 which, in response thereto, issues a signal to the airbag system 58 to trigger ignition of the pellet and inflation of the airbag. Conversely, in the event that one of the signal switches 54 or 56 is activated by the user, a digital signal related thereto is communicated to the second micro-controller 96 which, in turn, passes the switch signal through the digital/analog converter 94 to produce an analog signal corresponding to the switch signal which passes through second high pass filter 92, first high pass filter 90, first analog/digital converter 88 and into first micro-controller 78. The first micro-controller 78 can process the signal and distribute it either to the CAN transceiver 84 or to the steering column bus 80 for appropriate action.

In the embodiment of FIG. 3, the first and second micro-controllers 78, 96 provide digital headers to the various incoming digital signals which are then recognized in the other of the first and second micro-controllers 78, 96 for proper signal processing and routing.

FIG. 4 illustrates a second embodiment of the electronics in accordance with the invention in which the different information is transmitted in a time multiplexed fashion. The reference symbols in FIG. 4 correspond to those of FIG. 3 and are augmented simply with a prime symbol. Reference symbols corresponding to components in FIG. 4 which function in similar or identical fashion to corresponding reference symbols in FIG. 3 are not described in greater detail. The principal difference between the first micro-controller 78' of FIG. 4 and the first micro-controller 78 of FIG. 3 is that the first micro-controller 78' of FIG. 4 issues a clock signal transported along a clock signal lead 98 to first clock high pass filter 100. In the embodiment of FIG. 4, it is assumed that the digital communication electronics signals related to the communication of a crash signal to the airbag system 58', the communication of switching commands from first switch 54' and second switch 56' as well as excitation signals 62' emanating from the resolver electronics 60' and the associated x- and y-signals from the x-winding 34 and the y-winding 33 are all in a frequency range which is sufficiently lower than that of the clock frequency emanating from the first micro-controller 78' such that clock high pass filters 100, 102 transport the clock frequencies only, whereas all low pass filters 64', 70' and 104 only block the high frequency clock signals. The clock frequency can be in the MHz range and all other signals can be transmitted in a range between 10 to 100 kHz. The clock signal transported through the first clock high pass filter 100 is inductively distributed, via primary winding 16 and secondary winding 24, to the input of a second clock high pass filter 102 located in the steering wheel electronics 52 which, in turn, passes this clock signal to the clock frequency input of a second micro-controller 96' to ensure synchronization of timing in the two micro-controllers 96' and 78'. The additional low pass filter 104 passes analog signals between the analogue/digital converter 94' and the secondary winding 24 but does not pass the clock frequencies. A further control component of FIG. 4 which is not present in the embodiment of FIG. 3 is the linear gate 106. This linear gate 106 derives its gate timing from the clock signal lead 98 to open or close an input connecting the linear gate 106 to the output of the first digital/analog converter 88' and to the excitation signal 62' emanating from the resolver electronics 60'. In this fashion, an output of the linear gate 106 connected to the first low pass filter 64' either contains analog signals originally converted by the first digital/analog converter 88' in response to input from the first micro-controller 78' or the excitation signal 62', but not both. Similarly, the clock frequency drives the linear gate 106 to open and close inputs connecting to a second low pass filter 70' for receiving signals from the x- and y-winding 34, 33 of the stator 30 and allows these signals to be passed on to resolver electronics 60' via leads 72' and 74' thereby facilitating sampling of the angle α. This sampling information is then passed along lead 76' to the micro-controller 78'. The function of the circuit of FIG. 4 is otherwise completely analogous to that of FIG. 3.

Figure 5:
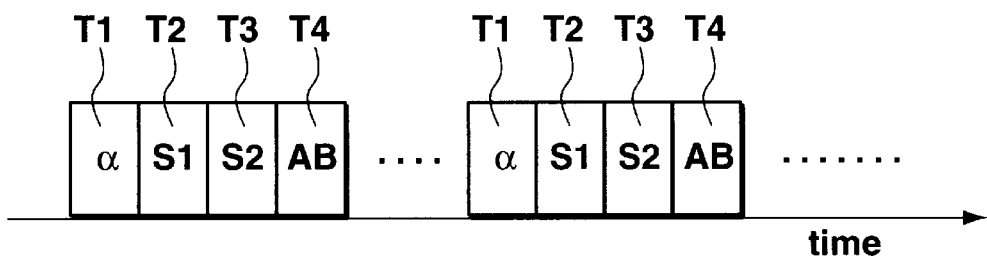
FIG. 5 shows a timing diagram corresponding to the embodiment for the electronics in accordance with the invention of FIG. 4.

FIG. 5 provides a brief scheme of possible organization of the time multiplexing signals in accordance with FIG. 4. In particular, a first block of signals can comprise a first time block T1 containing the angular information α from the resolver, a second time block T2 indicating whether or not first switch 54 has been activated, a third time block T3 reserving information emanating from a possibly activated second switch 56 and a fourth time block T4 for triggering the airbag. Other time blocks can be reserved for additional signals. The sequence of blocks is repeated regularly so that sampling thereof can indicate whether or not a function is to be executed. The first and second micro-controllers 78' and 96' can also include electronics for generating priorities among the various signals. For example, an airbag signal present in block T4 could trigger an interrupt, blocking passage of any subsequent signals until the airbag signal is processed. Alternatively, the widths of the blocks T1, T2, T3, T4 can be sufficiently narrow (for example 10 to 100 micro-seconds) that the time delay induced, due to time multiplexing, between emanation of a airbag trigger signal and inflation of the airbag is negligible compared to the amount of time which is in any event necessary to inflate the airbag.

In the embodiments shown in FIGS. 1 through 5, the electrical power for the steering wheel has been passed from the chassis to the steering wheel electronics 52 via first and second contact rings 44 and 46. Other embodiments are however possible in which the power is passed through the resolver secondary and primary windings in a manner analogous to the manner in which signals are processed as illustrated in FIGS. 3 and 4.

What is claimed is:

1. A device for measuring a steering angle and for transmitting signals between a steering rod and a steering column of a motor vehicle, the device comprising:

a primary winding mounted to a stationary member of the steering column;

a secondary winding mounted for secure rotation along with the steering rod and a steering wheel of the vehicle, said secondary winding disposed for inductive coupling to said primary winding;

a resolver rotor winding mounted for secure rotation along with the steering rod and the steering wheel of the vehicle, said rotor winding communicating with said secondary winding;

at least two mutually angled resolver stator windings inductively coupled to said rotor winding, said stator windings mounted to said stationary member of said steering column;

resolver electronics electrically connected to said stator windings and to said primary winding for passing resolver excitation signals to said primary winding, and for evaluating the steering angle based on said excitation signals following inductive passage thereof into said stator windings via said rotor winding;

a first electronic device mounted to said stationary member of the steering column and communicating with said primary winding for transmitting and receiving control signals to and from said steering wheel via said primary winding and said secondary winding;

a second electronic device mounted on said steering wheel and communicating with said secondary winding for transmitting and receiving said control signals to and from said first electronic device via said primary windind and said secondary winding; and a first frequency filter connected between said resolver electronics and said stator windings to pass said excitation signals from said stator windings to said resolver electronics and to block passage of said control signals from said stator windings to said resolver electronics.

2. The device of claim 1, wherein said first filter is a first low pass filter.

3. The device of claim 2, further comprising a first high pass filter connected between said secondary winding and said second electronic device to pass said control signals and to block said excitation signals.

4. The device of claim 3, further comprising a second low pass filter disposed between said resolver electronics and said primary winding to pass said excitation signals and to block said control signals.

5. The device of claim 3, further comprising a second high pass filter disposed between said first electronic device and said primary winding to pass said control signals and to block said excitation signals.

6. The device of claim 1, wherein operating signals for realizing a supply of power and activation signals are supplied to said primary winding in a frequency-selected fashion.

7. The device of claim 1, wherein said second electronic device comprises at least one of a trigger circuit for an air bag and a control circuit for connection of further electrical devices mounted on said steering wheel.

8. A device for measuring a steering angle and for transmitting signals between a steering rod and a steering column of a motor vehicle, the device comprising:

a primary winding mounted to a stationary member of the steering column;

a secondary winding mounted for secure rotation along with the steering rod and a steering wheel of the vehicle, said secondary winding disposed for inductive coupling to said primary winding;

a resolver rotor winding mounted for secure rotation along with the steering rod and the steering wheel of the vehicle, said rotor winding communicating with said secondary winding;

at least two mutually angled resolver stator windings inductively coupled to said rotor winding, said stator windings mounted to said stationary member of said steering column;

resolver electronics communicating with said stator windings and with said primary winding for passing resolver excitation signals to said primary winding and for evaluating the steering angle based on said excitation signals following inductive passage thereof into said stator windings via said rotor winding;

a first electronic device mounted to said stationary member of the steering column and communicating with said primary winding for transmitting and receiving control signals to and from said steering wheel via said primary winding and said secondary winding and for transmitting a clock signal;

a second electronic device mounted on said steering wheel and communicating with said secondary winding for transmitting and receiving said control signals to and from said first electronic device via said primary winding and said secondary winding and for receiving said clock signal; and a gate means connected between said resolver electronics and said primary winding and between said resolver electronics and said stator windings to pass and block said excitation signals using time multiplexing, said gate means having a clock input for accepting said clock signal to control said time multiplexing.

9. The device of claim 8, wherein said gate means is connected between said first electronic device and said primary winding for passing and blocking said control signals using said time multiplexing.

10. The device of claim 9, further comprising a first low pass filter disposed between said secondary winding and said second electronic device to pass said control signals and to block said clock signal.

11. The device of claim 10, further comprising a second low pass filter disposed between said gate means and said primary winding to pass said controls signals and said excitation signals and to block said clock signal.

* * * * *